(12) United States Patent
Wolfschwenger et al.

(10) Patent No.: US 8,912,263 B2
(45) Date of Patent: *Dec. 16, 2014

(54) PROPYLENE POLYMER COMPOSITIONS

(75) Inventors: Johannes Wolfschwenger, Niederneukirchen (AT); Christelle Grein, Linz (AT); Klaus Bernreitner, Linz (AT); Markus Gahleitner, Neuhofen/Krems (AT); Thor Kamfjord, Brevik (NO)

(73) Assignee: Borealis Technology Oy, Porwoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 13/038,970

(22) Filed: Mar. 2, 2011

(65) Prior Publication Data

US 2011/0218293 A1 Sep. 8, 2011

Related U.S. Application Data

(63) Continuation of application No. 11/667,883, filed as application No. PCT/EP2005/011979 on Nov. 9, 2005, now abandoned.

(30) Foreign Application Priority Data

Nov. 18, 2004 (EP) .................................... 04105890

(51) Int. Cl.
| | | |
|---|---|---|
| *C08L 23/16* | (2006.01) | |
| *C08J 3/00* | (2006.01) | |
| *C08L 23/18* | (2006.01) | |
| *B29C 45/00* | (2006.01) | |

(52) U.S. Cl.
CPC .. *C08L 23/16* (2013.01); *C08J 3/00* (2013.01); *C08L 23/18* (2013.01); *B29C 45/00* (2013.01)

USPC ........... 524/428; 525/240; 525/198; 525/195; 525/191

(58) Field of Classification Search
USPC ................... 524/428; 525/240, 198, 195, 191
See application file for complete search history.

(56) References Cited

U.S. PATENT DOCUMENTS

| | | | | |
|---|---|---|---|---|
| 6,011,102 | A * | 1/2000 | Shimojo et al. | 524/451 |
| 6,352,426 | B1 * | 3/2002 | Hutchinson et al. | 425/548 |
| 6,723,829 | B1 * | 4/2004 | Malm et al. | 528/481 |
| 7,105,603 | B2 * | 9/2006 | Dharmarajan et al. | 525/191 |
| 7,504,455 | B2 * | 3/2009 | Grein et al. | 524/528 |
| 2002/0019488 | A1 * | 2/2002 | Seelert et al. | 525/240 |
| 2004/0116607 | A1 * | 6/2004 | Malm et al. | 525/240 |

FOREIGN PATENT DOCUMENTS

EP  1344793  * 9/2003

OTHER PUBLICATIONS

Mader et al. Macromolecules 2000, 33, 1254-1261.*

* cited by examiner

*Primary Examiner* — Mark Kaucher
(74) *Attorney, Agent, or Firm* — Jordan and Hamburg LLP

(57) ABSTRACT

The invention relates to propylene polymer compositions comprising 50-70 wt % of a propylene homo- or copolymer, 5-20 wt % of a first elastomeric ethylene-propylene copolymer, 5-25 wt % of a second elastomeric ethylene-propylene copolymer and 5-30 wt % of an ethylene polymer. The propylene polymer compositions are suitable for molding and they have low haze and a good impact strength/stiffness balance with good impact strengths at low temperatures.

16 Claims, No Drawings

PROPYLENE POLYMER COMPOSITIONS

STATEMENT OF RELATED APPLICATIONS

The present application is a continuation of U.S. application Ser. No. 11/667,883, filed May 15, 2007, which is a continuation of International Application No. PCT/EP2005/011979, filed on Nov. 9, 2005. The disclosures of these applications are incorporated herein by reference.

BACKGROUND OF THE INVENTION

The present invention relates to propylene polymer compositions which are suitable for moulding, especially injection moulding. More particularly the propylene polymer compositions can be used for packaging applications, especially for deep freeze packaging applications because they have excellent impact strength/stiffness balance at low temperatures, sufficient flowability and good optical properties.

Transparent polypropylene compositions with superior toughness at low temperatures have become an important market trend in recent years. One type of targeted products is rather stiff with flexural moduli well above 800 MPa. Materials with good stiffness are required because structural integrity is necessary for the intended products in the moulding segment, e.g. for boxes, crates, thin wall packaging, etc.

Types of propylene polymers having the required transparency are for example propylene random copolymers with ethylene as comonomer. However, their impact resistance below 0° C. is insufficient and stiffness is below the required level.

There are also propylene polymers known, which have the required impact resistance at low temperatures. These polymers are heterophasic propylene copolymers, having a rubber phase (usually about 20-30 wt % rubber phase with 40-60 wt % propylene) dispersed in a continuous matrix phase. For a good low temperature impact resistance, the molecular weight of the rubber phase is higher than the molecular weight of the matrix phase. These heterophasic propylene copolymers are however very opaque. If the molecular weight of the polymer in the dispersed phase is lower than that of the matrix phase, transparency is increased and impact resistance is decreased. A lower total MFR of the composition results in an increased impact strength, however, the processability of the polymer composition which is required for the intended application (injection moulding) decreases.

It is therefore the object of the invention, to provide a polypropylene composition for moulding, which has low haze and which simultaneously shows a good impact strength/stiffness balance with good impact strengths at low temperatures.

SUMMARY OF THE INVENTION

The above object was achieved with a polypropylene composition having an MFR (230° C./2.16 kg)≥8 g/10 min comprising
A) 50-70 wt % of a propylene polymer comprising a propylene homopolymer and/or a propylene copolymer with up to 5 wt % ethylene and/or one or more $C_4$-$C_8$ α-olefins and having an intrinsic viscosity $IV_A$ 1.00-2.20 dl/g
B) 5-20 wt % of a first elastomeric ethylene-propylene copolymer having an intrinsic viscosity $IV_B$ 1.65-2.50 dl/g and an ethylene content of 20-40 wt %, preferably of 20-30 wt %, with $IV_B$>$IV_A$,
C) 5-25 wt % of a second elastomeric ethylene-propylene copolymer having an intrinsic viscosity $IV_C$ of 0.90-1.60 dl/g and an ethylene content of 45-85 wt %, preferably of 50-75 wt %,
D) 5-30 wt % of an ethylene polymer having an ethylene content of at least 80 mol % and having a melt index MI (190° C., 2.16 kg) of at least 5 g/10 min and a density of 905-925 $kg/m^3$.

DETAILED DESCRIPTION OF THE INVENTION

The propylene polymer A used for the propylene polymer composition according to the invention is either a propylene homopolymer or a propylene copolymer or mixtures thereof. When the propylene polymer comprises a propylene copolymer, the copolymer contains up to 5 wt % of ethylene and/or one or more $C_4$-$C_8$ α-olefins, preferably up to 2 mol % of comonomers. Among possible comonomers, ethylene and 1-butene are preferred.

It is further important, that the propylene polymer A has an intrinsic viscosity $IV_A$ 1.00-2.20 dl/g in order to guarantee a high flowability of the end-product.

It is also essential for the present invention, that a first elastomeric ethylene-propylene copolymer B having a low ethylene content of 20-40 wt % and a high intrinsic viscosity $IV_B$ of 1.65-2.50 dl/g and a second elastomeric ethylene-propylene copolymer C having a high ethylene content of 45-85 wt % and a low intrinsic viscosity of 0.90-1.60 dl/g are present. It was found, that it is beneficial for the impact strength, when the molecular weight of the elastomeric ethylene-propylene copolymer B with the low ethylene content is higher than the molecular weight of the propylene polymer A. Therefore, it is required that $IV_B$>$IV_A$.

A further essential component of the present invention is an ethylene polymer having an ethylene content of at least 80 mol %. For achieving good optical properties it is important for the ethylene polymer to have a melt index MI (190° C., 2.16 kg) of at least 5 g/10 min. Lower melt indices do not result in a composition having low haze. When the melt index of the ethylene polymer is too high, especially when it is >100 g/10 min the mechanical properties of the compositions, in particular toughness, are not sufficient.

Preferred ethylene polymers are LDPE and LLDPE.

The compositions of the present invention preferably have an MFR (230° C., 2.16 kg) of from 8 to 60 g/10 min.

According to an advantageous embodiment, the first elastomeric ethylene-propylene copolymer has an intrinsic viscosity $IV_B$ of 1.80-2.25 dl/g.

It is further preferred, that the second elastomeric ethylene-propylene copolymer has an intrinsic viscosity $IV_B$ of 0.90-1.50 dl/g.

For the polypropylene compositions according to the invention it is preferred, that the difference between the intrinsic viscosities of the first and second elastomeric ethylene-propylene copolymers $IV_B$-$IV_C$ is ≥0.2 dl/g. It is still more preferred, that $IV_B$-$IV_C$ is ≥0.4 dl/g.

For the polypropylene compositions of the present invention it is preferred that they contain, based on the total weight of components A to D, from 0.01-2 wt % of α-nucleating agents.

The addition of α-nucleating agents (of which some may also act as clarifiers) to propylene polymers increases their stiffness (and transparency). α-nucleating agents and clarifiers are therefore added for a high absolute level of stiffness and transparency.

Suitable α-nucleating agents include talc having a particle size of 0.01-1.0 μm, sodium benzoate, sodium-2,2'-methylene-bis(4,6-di-t-butylphenyl)phosphate, sodium-bis(4-t-butylphenyl)phosphate, 1,3,2,4-di(3',4'-dimethylbenzylidene) sorbitol and "ADK STAB NA21E" available from Asahi Denka Kogyo (Japan). If talc is used as nucleating agent, it is usually present in an amount of 0.01-1.0 wt %, which is an effective amount for α-nucleating, but which is not a sufficient amount where talc would already act as filler. A preferred nucleating agent is 1,3,2,4-di(3',4'-dimethylbenzylidene)sorbitol, which is available as "MILLAD 3988" from Milliken.

According to an advantageous embodiment the ratio (B+C)/D of the amounts of elastomeric copolymers (B+C) to the amount of ethylene polymer D is from 0.3:1 to 2.5:1.

It has been found, that outside of this ratio haze and impact strength are unsatisfactory.

The polypropylene compositions of the present invention are preferably produced by mixing
A) 50-70 wt % of a propylene polymer comprising a propylene homopolymer and/or a propylene copolymer with up to 5 wt % ethylene and/or one or more $C_4$-$C_8$ α-olefins and having an intrinsic viscosity $IV_A$ 1.00-2.20 dl/g,
B) 5-20 wt % of a first elastomeric ethylene-propylene copolymer having an intrinsic viscosity $IV_B$ 1.65-2.50 dl/g and an ethylene content of 20-40 wt %, with $IV_B$>$IV_A$,
C) 5-25 wt % of a second elastomeric ethylene-propylene copolymer having an intrinsic viscosity $IV_A$ of 0.90-1.60 dl/g and an ethylene content of 45-85 wt %,
D) 5-30 wt % of an ethylene polymer having an ethylene content of at least 80 mol % and having a melt index MI (190° C., 2.16 kg) of at least 10 g/10 min and a density of 905-925 kg/m$^3$, melting and homogenising and cooling and pelletising the mixture.

The propylene polymer compositions of the present invention are preferably produced by combining the propylene polymer A in the form of powder or granules, the elastomeric copolymers B and C and the ethylene polymer D and any additives and/or nucleating agents in a melt mixing device.

Melt mixing devices suited for this process are discontinuous and continuous kneaders, twin screw extruders and single screw extruders with special mixing sections and co-kneaders. The residence time must be chosen such that a sufficiently high degree of homogenisation is achieved.

Due to their advantageous property profile, the polymer compositions of the present invention are especially suited for injection moulding applications. The polymer compositions of the present invention are particularly suited for packaging applications, including thin wall packaging, for low temperatures.

Production of Propylene Polymer A

The propylene polymer A may be produced by single- or multistage process polymerisation of propylene or propylene and ethylene such as bulk polymerisation, gas phase polymerisation, slurry polymerisation, solution polymerisation or combinations thereof using conventional catalysts. A homo- or copolymer can be made either in loop reactors or in a combination of loop and gas phase reactor. Those processes are well known to one skilled in the art.

A suitable catalyst for the polymerisation of the propylene polymer is any stereospecific catalyst for propylene polymerisation which is capable of polymerising and copolymerising propylene and comonomers at a temperature of 40 to 110° C. and at a pressure from 10 to 100 bar. Ziegler Natta catalysts as well as metallocene catalysts are suitable catalysts.

One skilled in the art is aware of the various possibilities to produce propylene homo- and copolymers and will simply find out a suitable procedure to produce suitable polymers which are used in the present invention.

Production of Elastomeric Copolymers B and C

An ethylene propylene elastomeric copolymer may be produced by known polymerisation processes such as solution, suspension and gas-phase polymerisation using conventional catalysts. Ziegler Natta catalysts as well as metallocene catalysts are suitable catalysts.

A widely used process is the solution polymerisation. Ethylene, propylene and catalyst systems are polymerised in an excess of hydrocarbon solvent. Stabilisers and oils, if used, are added directly after polymerisation. The solvent and unreacted monomers are then flashed off with hot water or steam, or with mechanical devolatilisation. The polymer, which is in crumb form, is dried with dewatering in screens, mechanical presses or drying ovens. The crumb is formed into wrapped bales or extruded into pellets.

The suspension polymerisation process is a modification of bulk polymerisation. The monomers and catalyst system are injected into the reactor filled with propylene. The polymerisation takes place immediately, forming crumbs of polymer that are not soluble in the propylene. Flashing off the propylene and comonomer completes the polymerisation process.

The gas-phase polymerisation technology consists of one or more vertical fluidised beds. Monomers and nitrogen in gas form along with catalyst are fed to the reactor and solid product is removed periodically. Heat of reaction is removed through the use of the circulating gas that also serves to fluidise the polymer bed. Solvents are not used, thereby eliminating the need for solvent stripping, washing and drying.

The production of ethylene propylene elastomeric copolymers is also described in detail in e.g. U.S. Pat. No. 3,300,459, U.S. Pat. No. 5,919,877, EP 0 060 090 A1 and in a company publication by EniChem "DUTRAL, Ethylene-Propylene Elastomers", pages 1-4 (1991).

Alternatively, elastomeric ethylene-propylene copolymers, which are commercially available and which fulfil the indicated requirements, can be used.

Alternatively, polymers A, B and C may be produced in a series of reactors, e.g. starting with the production of polymer A in a loop reactor, transferring the product into a first gas phase reactor, where copolymer B is polymerised and finally transferring the product of the first two reactors into a second gas phase reactor, where copolymer C is polymerised.

Production of Ethylene Polymers D

It is preferred to use ethylene polymers which are commercially available, e.g. MA9230, CA9150, MA8200 from Borealis A/S. Alternatively, suitable ethylene polymers may be produced according to the following descriptions.

Low density polyethylene may be produced by free-radical-initiated polymerization using free radical initiators such as peroxide or oxygen in high pressure processes. The polymerization is carried out in tubular or stirred autoclave reactors at a temperature of about 130 to 330° C. and at a pressure around 700 to 3000 bars.

Linear low density polyethylene is made by the copolymerisation of ethylene and α-olefins. It may be produced in low pressure processes such as gas-phase process (for which the Unipol technology is a typical example), a solution-phase polymerisation process, a slurry process, or combinations thereof like staged gas phase (Union Carbide), staged slurry/gas phase (Borealis) or staged solution phase (Nova). A suitable catalyst for the polymerisation of LLDPE is any stereospecific catalyst which is capable of polymerising and copolymerising ethylene and comononers. Ziegler-Natta as well as metallocene catalysts are suitable catalysts. In the gas-phase process, reactor temperatures are usually below 100° C. with pressures of about 20 bars. In the solution process, reactor temperatures are usually 170-250° C. with pressures of 40-140 bars. In the solution-phase polymerisation process, reactor temperatures are usually 70-110° C. with pressures of 30-50 bars.

Measurement Methods

MFR

The melt flow rates were measured with a load of 2.16 kg at 230° C. for polypropylene and at 190° C. for polyethylene. The melt flow rate is that quantity of polymer in grams which the test apparatus standardised to ISO 1133 extrudes within 10 minutes at a temperature of 230° C. or 190° C. respectively, under a load of 2.16 kg.

The expressions "melt flow rate", "MFR" and "melt index MI" are in this document used synonymously for the respective property of propylene polymers and ethylene polymers.

Comonomer contents were measured with Fourier transform infrared spectroscopy (FTIR) calibrated with $^{13}$C-NMR.

Intrinsic Viscosity

Intrinsic Viscosity was measured according to DIN ISO 1628-1 (October 1999) in Decalin at 135° C.

Puncture Test

Impact strength was determined under biaxial loading. Puncture tests according to ISO6603/2 at −20° C. were performed using 60*60*2 mm injection moulded samples. Two parameters were determined: $F_{max}$, the maximum of the load-deflection curve, and $W_{tot}$, the total energy absorbed by the sample (i.e. the area under the load-deflection curve).

Bending Test

Bending tests were performed according to ISO 178 using 80*10*4 mm injection moulded specimens as described in EN ISO 1873-2. Bending modulus, E-modulus, was determined according to ISO 178 at 2 mm/min in between strains of 0.05% to 0.25%.

Haze

Haze was determined according to ASTM D 1003-92 on injection moulded test plaques (60×60×2 mm).

EXAMPLES

Preparation of Polymers A

The propylene polymers A used for the present invention were prepared according to the following procedure:

Homopolymers:

Raw Materials:

Hexane dried over molecular sieve (3/10 A)

TEAL: 93% from Sigma-Aldrich

Donor: Dicyclopentyldimethoxysilane: ex Wacker Chemie (99%).

$N_2$: supplier AGA, quality 5.0; purification with catalyst BASF R0311, catalyst G132 (CuO/ZNO/C), molecular sieves (3/10 A) and $P_2O_5$.

Propylene: polymerisation grade

Hydrogen: supplier AGA, quality 6.0

The catalyst ZN104 is commercially available from Basell.

Sandostab P-EPQ is commercially available from Clariant.

A 20 l autoclave reactor has been purified by mechanical cleaning, washing with hexane and heating under vacuum/$N_2$ cycles at 160° C. After testing for leaks with 30 bar $N_2$ over night reactor has been vacuumed and filled with 5250 g propylene by weighing and 51.4 nl $H_2$ by pressure monitoring from a 50 l steel cylinder.

80 mg of ZN104-catalyst are activated for 5 minutes with a mixture of Triethylaluminium (TEAl; solution in hexane 1 mol/l) and Dicyclopentyldimethoxysilane as donor (0.3 mol/l in hexane)—in a molar ratio of 4 after a contact time of 5 min—and 10 ml hexane in a catalyst feeder. The molar ratio of TEAl and Ti of catalyst is 250. After activation the catalyst is spilled with 250 g propylene into the stirred reactor with a temperature of 23° C. Stirring speed is hold at 250 rpm. After 6 min prepolymerisation at 23° C. temperature is increased to 70° C. in about 14 min. After holding that temperature for 1 hour polymerisation is stopped by flashing propylene and cooling to room temperature.

After spilling the reactor with $N_2$ the homopolymer powder is transferred to a steel container and stabilized with 0.1 wt % of Sandostab P-EPQ and 0.2 wt % of Ionol in acetone and dried over night in a hood and additionally for 2 hours at 50° C. under vacuum.

The amount of polymer powder (A2) was 1864 g and the MFR (230° C., 2.16 kg) was 44 g/10 min.

Random Copolymers

Raw Materials:

Hexane dried over molecular sieve (3/10 A)

TEAL: 93% from Sigma-Aldrich

Donor: Dicyclopentyldimethoxysilane: ex Wacker Chemie (99%).

$N_2$: supplier AGA, quality 5.0; purification with catalyst BASF R0311, catalyst G132 (CuO/ZNO/C), molecular sieves (3/10 A) and $P_2O_5$.

Ethylene, Propylene: polymerisation grade

Hydrogen: supplier AGA, quality 6.0

The catalyst ZN101 is commercially available from Basell.

Sandostab P-EPQ is commercially available from Clariant.

A 20 l autoclave reactor has been purified by mechanical cleaning, washing with hexane and heating under vacuum/$N_2$ cycles at 160° C. After testing for leaks with 30 bar $N_2$ over night reactor has been vacuumed and filled with 4250 g propylene by weighing.

23.9 mg of ZN101-catalyst are activated for 5 minutes with a mixture of Triethylaluminium (TEAl; solution in hexane 1 mol/l) and Dicyclopentyldimethoxysilane as donor (0.3 mol/l in hexane)—in a molar ratio of 20 after a contact time of 5 min—and 10 ml hexane in a catalyst feeder. The molar ratio of TEAl and Ti of catalyst is 100. After activation the catalyst is spilled with 250 g propylene into the stirred reactor. Stirring speed is hold at 215 rpm. After 15 min prepolymerisation at 13° C. 30 nl $H_2$ have been dosed into the reactor and constant ethylene dosing has been started to achieve the target ethylene content in the product. Stirring speed is increase to 250 rpm and temperature to 70° C. (achieved after 16 min). After holding these conditions for 124 min (starting from dosing of $H_2$), polymerisation is stopped by flashing and cooling to room temperature.

After spilling the reactor with $N_2$ the random copolymer is transferred to a steel container and stabilized with 0.1 wt % of Sandostab P-EPQ and 0.2 wt % of Ionol in acetone and dried over night in a hood and additionally for 2 hours at 50° C. under vacuum.

The amount of polymer powder (A1) was 1520 g, ethylene content 1.2 wt % and the MFR (230° C., 2.16 kg) was 16 g/10 min.

The following polymers A were prepared: according to the above procedures:

| polymer No. | MFR [g/10 min] | C2 [wt %] | IV [dl/g] |
|---|---|---|---|
| A1 | 16 | 1.2 | 1.48 |
| A2 | 44 | 0 | 1.19 |

Preparation of Elastomeric Copolymers B and C

The elastomeric copolymers of the present invention were prepared according to the following procedure:

A 5 l-reactor (autoclave) filled with about 0.2 barg propylene (polymerisation grade) is pressured up with 3.0 barg $H_2$. Then 300 g of propylene are added.

5 mg of a ZN104 catalyst is contacted with 0.3 ml white oil for about 16 hours and then activated for 5 minutes with a mixture of Triethylaluminium (TEAT; solution in hexane 1 mol/l) and Dicyclopentyldimethoxysilane as donor (0.3 mol/l in hexane)—in a molar ratio of 76 using a contact time of 5 min. The molar ratio of TEAl and Ti of catalyst was 380 and TEAl concentration in TEAl/donor mixture 12.6 mg/ml hexane. After activation the catalyst is transferred to the reactor by spilling in with 500 g propylene. After 12 min pre-polymerisation at 30° C. 90 g of ethylene is added to the reactor and the temperature is increased to 55° C. During heating up additional ethylene dosing is started to achieve the pressure of 34.2 barg at 55° C. Total pressure is hold constantly via continuously dosing of ethylene during polymerisation. 30 min after end of prepolymerisation the reaction is stopped by flashing of monomers and cooling.

The amount of polymer powder was 102 g.

The polymer is stabilized with 0.1 wt % of Sandostab P-EPQ and 0.2 wt % of lonol in acetone and dried over night in a hood and additionally for 2 hours at 50° C. under vacuum.

The resulting rubber copolymer (B3) has an intrinsic viscosity of 2.11 dl/g and an ethylene content of 49.8 wt %.

The following elastomeric ethylene-propylene copolymers were prepared according to the above procedure, except that $H_2$ and ethylene amounts were varied to achieve different intrinsic viscosities and comonomer concentrations.

| polymer No. | i.V. [dl/g] | C2 [wt %] |
|---|---|---|
| B1 | 2.00 | 22.8 |
| B2 | 2.01 | 25.9 |
| B3 | 2.11 | 49.8 |
| B4 | 2.17 | 29.5 |
| B5 | 1.51 | 25.2 |
| C1 | 1.05 | 67.4 |
| C2 | 1.58 | 54.6 |
| C3 | 1.03 | 70.5 |
| C4 | 1.19 | 51.9 |

Ethylene Polymers D

The ethylene polymers D which are used for the present invention are selected among commercially available homo- and copolymers.

The following ethylene homo- and copolymers were used in the examples:

| polymer No. | commercial grade designation | comonomer | comonomer content [wt %] | Melt Index (190° C., 2.16 kg) [g/10 min] | density [g/cm³] |
|---|---|---|---|---|---|
| D1 | MA9230 | — | — | 22.0 | 0.923 |
| D2 | CA9150 | — | — | 15.0 | 0.915 |
| D3 | MA8200 | — | — | 7.0 | 0.920 |
| D4 | FB4230 | 1-butene | 6.5 | 0.4 | 0.923 |

The ethylene polymers MA9230, CA9150, MA8200 and FB4230 are commercially available from Borealis A/S.

For the examples (E1 to E8, CE1 to CE13), the appropriate amounts of propylene polymers A1 and A2, elastomeric ethylene-propylene copolymers B1 to B5 and C1 to C4, ethylene polymers D1 to D4, conventional additives (0.05 wt % Hydrotalcite (DHT-4A), 0.1 wt % Irgafos 168, 0.1 wt % Irganox 1010, 0.05 wt % Ca-stearate, in each case based on the sum of the weights of components A to D) and nucleant (0.2 wt % Millad 3988, based on the sum of the weights of components A to D) were mixed in an intensive mixer (Henschel mixer) for 25 seconds. The compositions were then compounded in a twin screw extruder at a temperature of 250° C. The strands were quenched in cold water and pelletised.

The compositions (E2, CE4) were subjected to peroxidic degradation (visbreaking) with Altrix 3021. The MFR was increased up to about 30 g/10 min.

The amounts of each component and the results of the measurements are shown in Tables 1 and 2.

TABLE 1

| | component A | | component B | | component C | | component D | | MFR [g/10 min] | vis-broken | |
|---|---|---|---|---|---|---|---|---|---|---|---|
| | type | amount [pbw] | type | amount [pbw] | type | amount [pbw] | type | amount [pbw] | | | |
| CE1 | A1 | 76.5 | B1 | 10.0 | C1 | 13.5 | — | — | 12.1 | no | Influence of presence of |
| E1 | A1 | 68.8 | B1 | 9.0 | C1 | 12.2 | D2 | 10.0 | 12.7 | no | component D and of |
| E2 | A1 | 68.8 | B1 | 9.0 | C1 | 12.2 | D2 | 10.0 | 33.8 | yes | visbreaking |
| CE2 | A1 | 75.5 | — | — | C2 | 24.5 | — | — | 12.3 | no | Influence of presence of |
| CE3 | A1 | 68.0 | — | — | C2 | 22.0 | D2 | 10.0 | 12.0 | no | component B and of |
| CE4 | A1 | 68.0 | — | — | C2 | 22.0 | D2 | 10.0 | 30.7 | yes | visbreaking |
| CE5 | A2 | 77.2 | B2 | 8.5 | C3 | 14.3 | — | — | 26.6 | no | Influence of presence of |
| E3 | A2 | 65.7 | B2 | 7.2 | C3 | 12.1 | D2 | 15.0 | 24.0 | no | component D with different |
| CE6 | A2 | 79.0 | B5 | 21.0 | — | — | — | — | 35.3 | no | components B and C |
| CE7 | A2 | 67.1 | B5 | 17.9 | — | — | D2 | 15.0 | 34.5 | no | |
| CE8 | A2 | 78.5 | B3 | 7.9 | C4 | 13.6 | — | — | 31.5 | no | |
| CE9 | A2 | 66.7 | B3 | 6.7 | C4 | 11.6 | D2 | 15.0 | 29.4 | no | |
| CE10 | A2 | 75.6 | B4 | 4.7 | C4 | 4.7 | D2 | 15.0 | 31.9 | no | Influence of total amount of |
| CE11 | A2 | 71.4 | B4 | 6.8 | C4 | 6.8 | D2 | 15.0 | 29.1 | no | components B and C |
| E4 | A2 | 67.2 | B4 | 8.9 | C4 | 8.9 | D2 | 15.0 | 26.7 | no | |
| CE11 | A2 | 71.4 | B4 | 6.8 | C4 | 6.8 | D2 | 15.0 | 29.1 | no | Influence of amount of |
| CE12 | A2 | 67.4 | B4 | 6.3 | C4 | 6.3 | D2 | 20.0 | 28.9 | no | component D |

TABLE 1-continued

| | component A | | component B | | component C | | component D | | MFR [g/10 min] | vis-broken | |
|---|---|---|---|---|---|---|---|---|---|---|---|
| | type | amount [pbw] | type | amount [pbw] | type | amount [pbw] | type | amount [pbw] | | | |
| E5 | A2 | 63.4 | B4 | 5.8 | C4 | 5.8 | D2 | 25.0 | 30.4 | no | |
| E6 | A2 | 59.9 | B2 | 9.4 | C3 | 15.7 | D1 | 15.0 | 21.8 | no | Influence of type of component D |
| E7 | A2 | 59.9 | B2 | 9.4 | C3 | 15.7 | D2 | 15.0 | 20.6 | no | |
| E8 | A2 | 59.9 | B2 | 9.4 | C3 | 15.7 | D3 | 15.0 | 19.1 | no | |
| CE13 | A2 | 59.9 | B2 | 9.4 | C3 | 15.7 | D4 | 15.0 | 15.9 | no | |
| E3 | A2 | 65.7 | B2 | 7.2 | C3 | 12.1 | D2 | 15.0 | 24.0 | no | Influence of ratio (B + C)/D |
| CE14 | A2 | 73.3 | B2 | 8.1 | C3 | 13.6 | D2 | 5.0 | 25.0 | no | |

TABLE 2

| | MFR [g/10 min] | Haze [%] | Fmax [N] | Wtot [J] | E-Modulus [MPa] | |
|---|---|---|---|---|---|---|
| CE1 | 12.1 | 88.2 | 1856 | 6.8 | 1128 | Influence of presence of component D and of visbreaking |
| E1 | 12.7 | 59.4 | 2125 | 24.4 | 955 | |
| E2 | 33.8 | 75.7 | 2100 | 22.9 | 922 | |
| CE2 | 12.3 | 95.5 | 2591 | 15.9 | 1112 | Influence of presence of component B and of visbreaking |
| CE3 | 12.0 | 84.8 | 2710 | 27.6 | 983 | |
| CE4 | 30.7 | 95.6 | 2643 | 25.6 | 880 | |
| CE5 | 26.6 | 95.0 | 1820 | 7.1 | 1495 | Influence of presence of component D with different components B and C |
| E3 | 24.0 | 71.6 | 2631 | 21.3 | 1238 | |
| CE6 | 35.3 | 91.9 | 254 | 0.2 | 1390 | |
| CE7 | 34.5 | 61.8 | 388 | 0.4 | 1120 | |
| CE8 | 31.5 | 98.6 | 2297 | 10.2 | 1502 | |
| CE9 | 29.4 | 84.3 | 2656 | 20.7 | 1250 | |
| CE10 | 31.9 | 52.7 | 276 | 0.2 | 1269 | Influence of total amount of components B and C |
| CE11 | 29.1 | 61.4 | 524 | 0.6 | 1179 | |
| E4 | 26.7 | 68.7 | 2695 | 20.6 | 1096 | |
| CE11 | 29.1 | 61.4 | 524 | 0.6 | 1179 | Influence of amount of component D |
| CE12 | 28.9 | 60.5 | 541 | 0.7 | 1242 | |
| E5 | 30.4 | 53.3 | 2710 | 19.1 | 1066 | |
| E6 | 21.8 | 74.3 | 2527 | 28.9 | 1029 | Influence of type of component D |
| E7 | 20.6 | 76.3 | 2510 | 28.1 | 1027 | |
| E8 | 19.1 | 78.7 | 2524 | 28.1 | 1033 | |
| CE13 | 15.9 | 93.1 | 2527 | 27.1 | 1018 | |
| E3 | 24.0 | 71.6 | 2631 | 21.3 | 1238 | Influence of ratio (B + C)/D |
| CE14 | 25.0 | 91.0 | 1850 | 7.5 | 1435 | |

The invention claimed is:

1. A polypropylene composition for moulding having an MFR (230° C./2.16 Kg)>8 g/10 min comprising
   A) 50-70 wt % of a propylene polymer comprising a propylene homopolymer and/or a propylene copolymer with up to 5 wt % ethylene and/or one or more $C_4$-$C_8$ α-olefins and having an intrinsic viscosity $IV_A$ 1.00-2.20 dl/g, measured according to DIN ISO 1628 in decalin at 135° C.,
   B) 5-20 wt % of a first elastomeric ethylene-propylene copolymer having an intrinsic viscosity $IV_B$ 1.65-2.50 dl/g, measured according to DIN ISO 1628 in decalin at 135° C., and an ethylene content of 20-40 wt %, with $IV_B > IV_A$,
   C) 5-25 wt % of a second elastomeric ethylene-propylene copolymer having an intrinsic viscosity $IV_C$ of 0.90 1.60 dl/g, measured according to ISO 1628 in decalin at 135° C., and an ethylene content of 45-85 wt %, and
   D) 5-30 wt % of an ethylene polymer having an ethylene content of at least 80 mol % and having a melt index MI (190° C., 2.16 kg) of at least 5 g/10 min and a density of 905-925 kg/m$^3$.

2. Polypropylene composition according to claim 1, wherein the first elastomeric ethylene-propylene copolymer has an intrinsic viscosity $IV_B$ of 1.80 2.25 dl/g.

3. Polypropylene composition according to claim 1 or 2, wherein the second elastomeric ethylene-propylene copolymer has an intrinsic viscosity $IV_C$ of 0.90-1.50 dl/g.

4. Polypropylene composition, according to claim 1 or 2, wherein $IV_B - IV_C > 0.2$ dl/g.

5. Polypropylene composition according to claim 1 or 2 further comprising, based on the total weight of A to D, 0.01-2 wt % of α-nucleating agents.

6. Polypropylene composition according to claim 1 or 2, wherein the ratio (B+C)/D of the amounts of elastomeric copolymers (B+C) to the amount of ethylene polymer D is from 0.3:1 to 2.5:1.

7. Process for producing a polypropylene composition of claim 1 or 2, comprising mixing
   A) 50-70 wt % of a propylene polymer comprising a propylene homopolymer and/or a propylene copolymer with up to 5 wt % ethylene and/or one or more $C_4$-$C_8$ α-olefins and having an intrinsic viscosity $IV_A$ 1.00-2.20 dl/g, measured according to DIN ISO 1628 in decalin at 135° C.,
   B) 5-20 wt % of a first elastomeric ethylene-propylene copolymer having an intrinsic viscosity $IV_B$ 1.65-2.50 dl/g, measured according to DIN ISO 1628 in decalin at 135° C., and an ethylene content of 20-40 wt %, with $IV_B > IV_A$,
   C) 5-25 wt % of a second elastomeric ethylene-propylene copolymer having an intrinsic viscosity $IV_C$ of 0.90-1.60 dl/g, measured according to DIN ISO 1628 in decalin at 135° C., and an ethylene content of 45-85 wt %, and
   D) 5-30 wt % of an ethylene polymer having an ethylene content of at least 80 mol % and having a melt index MI (190° C., 2.16 kg) or at least 5 g/10 min and a density of 905-925 kg/m$^3$ in order to make a mixture,
melting the mixture, homogenizing the mixture,
cooling the mixture, and pelletizing the mixture.

8. Polypropylene composition, according to claim 1 or 2, wherein $IV_B - V_C > 0.4$ dl/g.

9. A method of producing a shaped article, comprising injection molding a composition of claim 1 or 2.

10. A method of producing packaging, comprising injection molding a composition of claim 1 or 2.

11. A method of producing thin wall packaging, comprising injection molding a composition of claim 1 or 2.

12. A shaped article produced by the method of claim 11.

13. A shaped article produced by the method of claim 9.

14. A shaped article produced by the method of claim 10.

15. A polypropylene composition for molding having an MFR (230° C./2.16 kg)≥8 g/10 min comprising
   A) 50-70 wt % of a propylene polymer comprising a propylene homopolymer and/or a propylene copolymer with up to 5 wt % ethylene and/or one or more $C_4$-$C_8$ α-olefins and having an intrinsic viscosity $IV_A$ 1.00-2.20 dl/g, measured according to DIN ISO 1628 in decalin at 135° C.;

B) 5-20 wt % or a first elastomeric ethylene-propylene copolymer having an intrinsic viscosity $IV_B$ 1.80-2.25 dl/g, measured according to DIN ISO 1628 in decalin at 135° C., and an ethylene content of 20-40 wt %, wherein $IV_B > IV_A$;

(C) 5-25 wt % of a second elastomeric ethylene-propylene copolymer having an intrinsic viscosity $IV_C$ of 0.90-160 dl/g, measured according to ISO 1628 in decalin at 135° C., and an ethylene content of 45-85 wt %, wherein $IV_B - IV_C^3$ 0.2 dl/g; and D) 5-30 wt % aim ethylene polymer having an ethylene content of at least 80 mol % and having a inch index MI (190° C., 2.16 kg) of at least 5 g/10 min and a density of 905-925 kg/m³, wherein the ratio (B+C)/D of the amounts of elastomeric copolymers (B+C) to the amount of ethylene polymer D is from 0.3:1 to 2.5:1.

16. The polypropylene composition of claim 15 wherein $IV_B - IV_C^3$ 0.4 dl/g.

* * * * *